Nov. 6, 1934.　　T. M. HUNTER　　1,979,881
ROTARY WELDING TRANSFORMER
Filed Feb. 20, 1931　　6 Sheets-Sheet 2

Inventor
THOMAS M HUNTER
Attorney
A. D. T. Libby

Patented Nov. 6, 1934

1,979,881

UNITED STATES PATENT OFFICE 1,979,881

ROTARY WELDING TRANSFORMER

Thomas M. Hunter, East Orange, N. J.

Application February 20, 1931, Serial No. 517,176

20 Claims. (Cl. 219—6)

This invention relates to a transformer of the rotary type which is particularly adapted for use in welding metal, especially tubing.

One of the objects of my invention is to provide a rotary transformer in which the parts carrying current are so designed and arranged that they may be cooled, whereby these parts may carry very heavy current so that metal having a relatively thick wall may be welded.

Another object of my invention is to provide a rotary transformer especially suited for welding tubing, in which the parts are so designed and arranged that the electrical efficiency may be held at a high value, even though extra heavy current is utilized at the welding rolls.

Another object of my invention is to provide a construction in which certain parts of the transformer may be readily disassembled for the purpose of inspecting or cleaning the cooling fluid passages.

Another object of my invention is to provide a rotary welding transformer in which those parts of the welding rolls, which come in actual contact with the tubing or material to be welded, may be readily renewed without disassembling the transformer per se.

Other objects may occur to one skilled in this art after a study of the specification and drawings, wherein.

Referring now to the drawings wherein like numbers refer to the corresponding parts in the various views, 1 is a hollow shaft of a rotary transformer supported in any suitable manner as by pedestals 2 and 3 supported on a base 4, but preferably insulated therefrom as by insulators 5. In a transformer of this character, where heavy pressures are used on the rolls, I prefer to use roller bearings for the shaft 1. The shaft and transformer are ordinarily rotated by the passage of the tube or material to be welded coming in contact with the welding rolls 6 and 7, although power may be applied in some suitable manner directly to the shaft 1 which must synchronize with the tube or material driving the mechanism. The welding rolls 6 and 7 are preferably separated by an insulator 8 and are also preferably provided with segmental contact shoes 9 removably attached to the rolls 6 and 7 in any satisfactory manner as by insulated bolts 10 (see Figs. 1 and 12, etc.).

Figure 3:
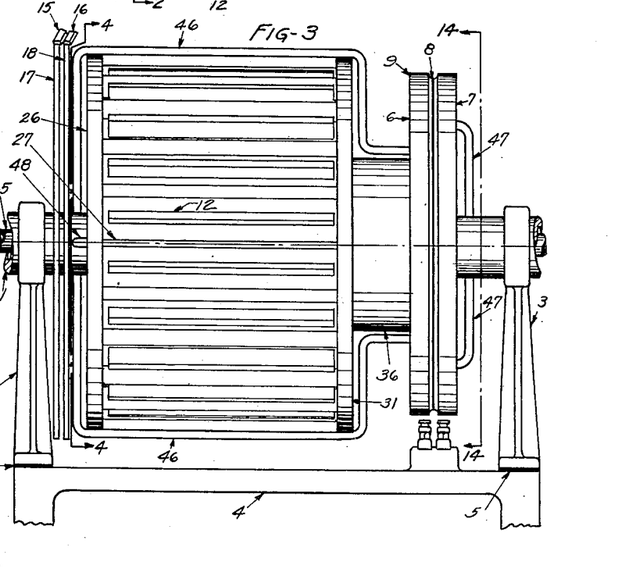
Figure 3 is a side elevation of the transformer shown in Figure 1, including a part of the base and bearing support members, and the primary contact rings.
Figure 4:
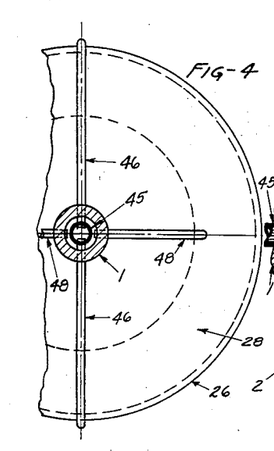
Figure 4 is a view on the line 4—4 of Figure 3.
Figure 5:
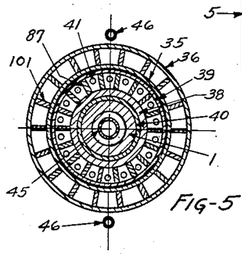
Figure 5 is a sectional view on the line 5—5 of Figure 1.
Figures 6, 7, 8, 9, 10:
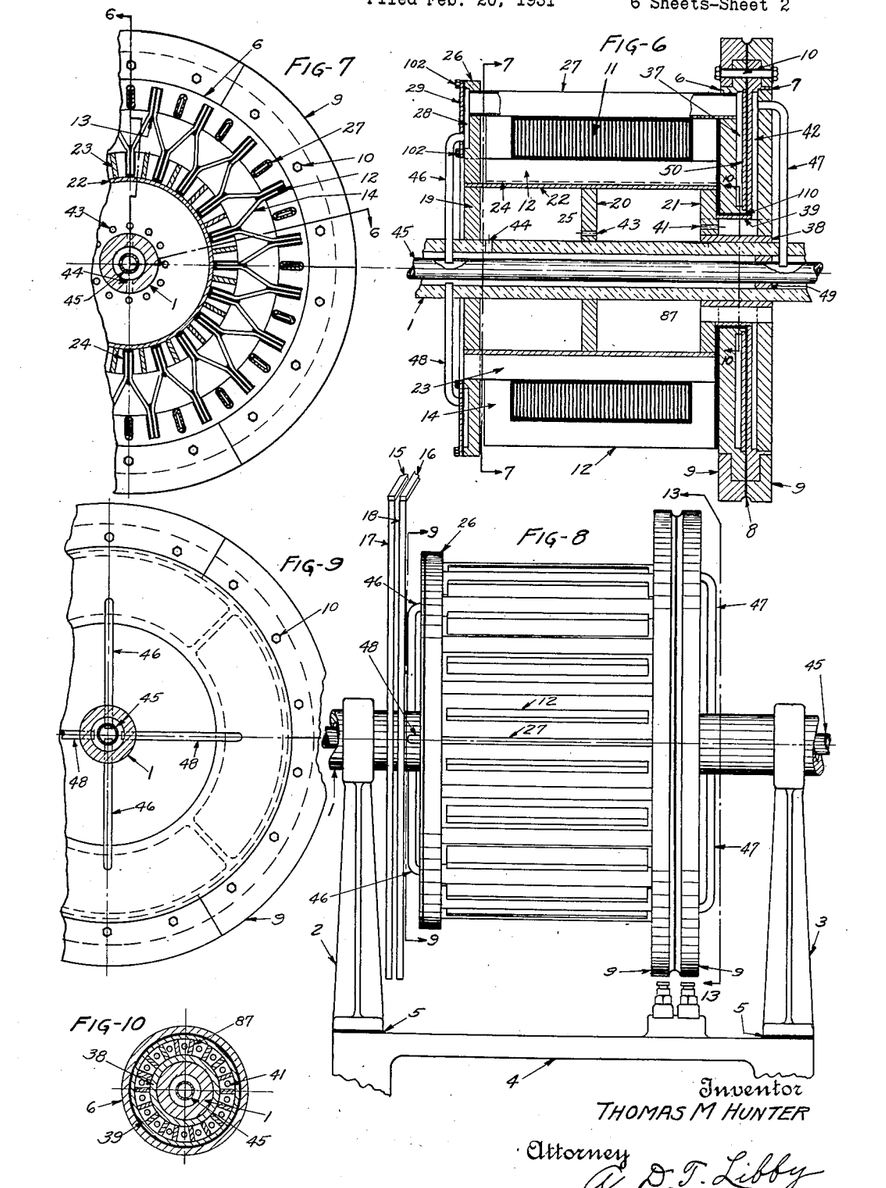
Figure 6 is a sectional view on the line 6—6 of Figure 7 of a modified form of transformer somewhat similar to that shown in Figure 1, except that the welding rolls are brought closer to the core and are of a larger diameter than the core.
Figure 7 is a part-sectional view on the line 7—7 of Figures 6 and 11.
Figure 8 is a side elevation of the transformer shown in Figure 6, the view being similar to that shown in Figure 3.
Figure 9 is a view on the plane 9—9 of Figure 8.
Figure 10 is a section on the line 10—10 of Figure 6.
Figure 14:
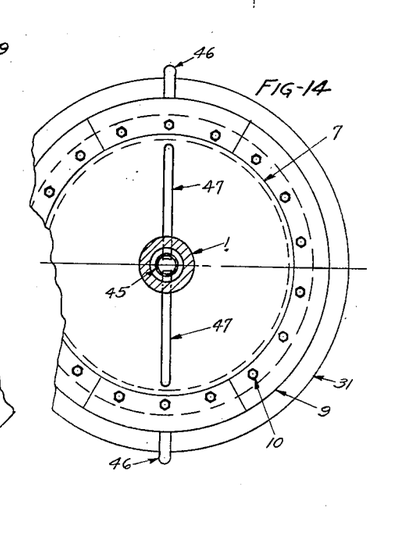
Figure 14 is a view on the plane 14—14 of Figure 3.
Figure 19:
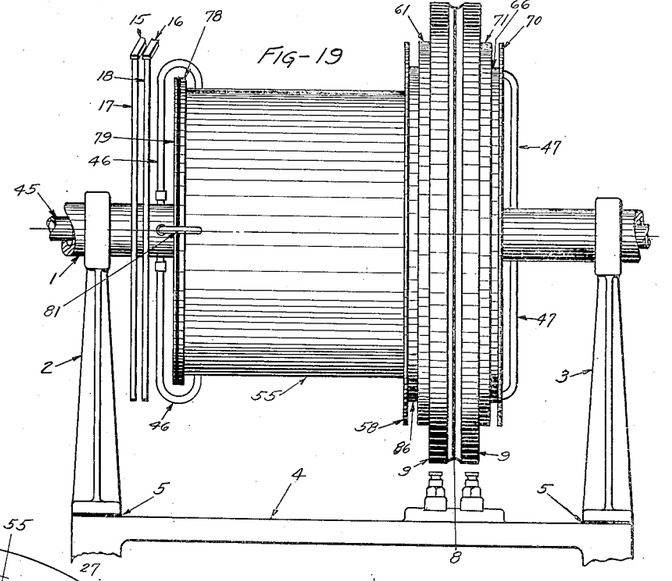
Figure 19 is a side elevation of a rotary transformer showing how the same may be completely enclosed, the enclosure serving to keep the dirt out of the transformer as well as to assist in cooling it. This is also an elevation of Figure 23.

In Figures 1 to 5 inclusive, and Figure 14, the welding rolls 6 and 7 are spaced a distance from the core 11 and as shown, are of somewhat smaller diameter than the completed body of the transformer. The primary winding 12 is looped around the core 11, the turns being insulated from each other and from the core as by suitable insulators generally referred to as 13. As shown, the primary turns 12 are connected together at the ends in a manner indicated by 14 (Fig. 2), and current is conveyed to the primary by means of brushes 15 and 16 engaging contact rings 17 and 18. As indicated in Figures 3, 8, and 19, the connections between the slip contact rings 17 and 18 and the primary turns are not shown for the sake of clarity, but it is to be understood that these rings are connected to the primary winding in any satisfactory manner.

Figures 1, 2:
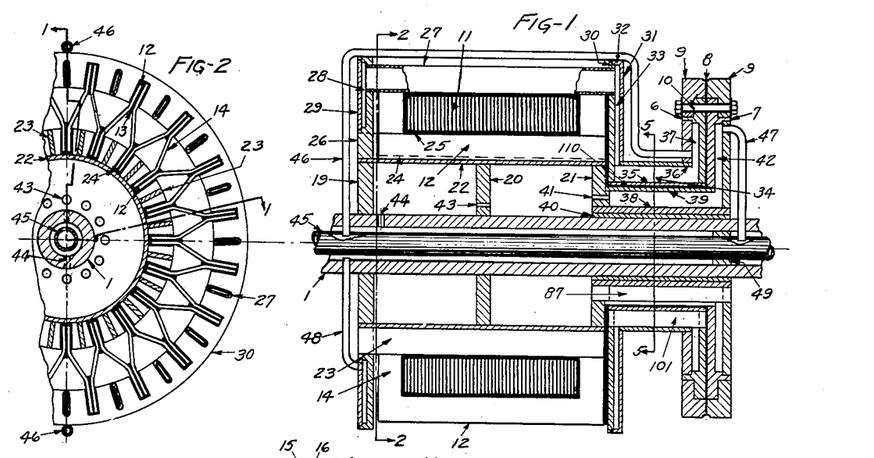
Figure 1 shows a sectional view through one form of my improved transformer on the line 1—1 of Figure 2.
Figure 2 is a part-sectional view on the line 2—2 of Figure 1.

As shown in Figure 1, the shaft 1, carries spacing members 19, 20. and 21, which are positioned within a metallic tube 22 preferably of copper. Resting and contacting directly on the tube 22, are the inner portions 23 of the secondary turns. The inner portions of the primary turns 12 also rest on the tube 22, but are insulated therefrom by suitable insulators 24, and the core 11 is supported by the insulator 25 on the outer surface of these inner turns of primary and secondary. Positioned over one end of the tube 22, substantially over the spacing member 19, is an annular disc 26 having perforations therein to receive the ends of the outer portions 27 of the secondary. Preferably, the ends of the outer portions 27 are brazed or welded to the member 26. As shown, these outer portions of the secondary turns are hollow and the ends open into a chamber 28 formed by an annular plate 29 which is placed over a recessed portion of the member 26. This plate 29 is attached to the member 26 in any satisfactory manner, and as indicated, it may be soldered thereto so that the solder can be readily melted on the close application of heat, whereby the plate 29 may be removed for cleaning out the hollow conductor portions 27 as may sometimes be necessary where the transformer is cooled with water containing lime or compounds thereof, or other matter which will collect on the inner walls of the conductors.

The opposite ends of the tube conductors 27 are fitted into openings in an annular member 30 and are brazed or welded thereto.

Spaced by an integral flange 32, away from the member 30, is a disc-shaped member 31, thereby forming cooling chamber 33. The chamber 33 opens into an annular chamber 34 formed between two annular tube members 35 and 36, the latter of which is supported by electrode connecting bars 101. The member 36 at one end is brazed or welded to the member 31 and to bars 101, and at the other end to the electrode 6 forming part of the welding wheel. Likewise, the member 35 is brazed or welded at one end to the member 30 and at the other end to the wheel electrode 6, thereby forming a passage into the space 37 in said wheel electrode. In a similar manner, connected to the other welding electrode 7, is a pair of cylindrical tubes 38 and 39, the former shown resting on a spacing collar 40 which is fastened to the shaft 1. Both the cylindrical tubes 38 and 39 are brazed or welded to the spacing collar 21 which is provided with a plurality of holes 41, thereby forming passages for the cooling fluid from the chamber 42 in the electrode wheel 7 to the space between the shaft 1 and the tube 22.

The spacing collar 20 is also provided with a plurality of holes 43 so as to make the cooling chambers within the tube 22 practically one. A hole 44 is provided in the shaft 1 to allow passage of the cooling fluid to the space between the pipe 45 carrying the cooling fluid, and the shaft 1. Pipes 46 and 47 carry the cooling fluid from the main supply pipe 45 to the chambers 37 and 42 in the electrode wheel parts 6 and 7, from which chambers the fluid is passed to the space between the shaft 1 and the pipe 45 in the manner indicated, it being understood that one or more pipes 48 return the fluid from the annular chamber 28 to the space between the shaft 1 and the pipe 45, this space being closed off at one end by the collar 49. It is also to be understood that the shaft 1 and the supply pipe 45 are provided with a rotary valve in the manner heretofore practiced, so this part has not been illustrated.

Figure 21:
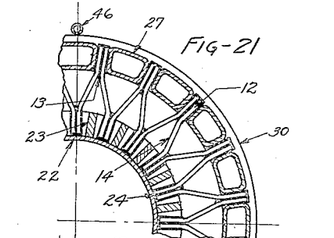
Figure 21 shows a fragmentary section of a modified way of arranging the outer part of the secondary turns as shown in Figure 2.

From the above description, it will be seen that water or some other cooling fluid may be circulated through the hollow electrode wheels and through hollow portions of at least part of the secondary loop turns, as well as through the interior portion of the transformer, thereby enabling it to carry very heavy welding current continuously without undue heating, it being understood that the tubes, especially the tubes comprising the secondary, which carry the current to the welding wheel electrode, are of copper or other good current-conducting material. While the secondary is being cooled, as has been described, the primary loop turns are also cooled because of their intermingled relationship and close proximity to the secondary loop turns. This feature is especially brought out in Figure 21, wherein the secondary outer loop portions are expanded to fill the entire space between the outer portions of the primary turns 12. The construction shown in Figure 21 also provides a very large interior passage-way through the outer secondary loop turns so that the cooling effect is greatly accelerated.

Figure 13:
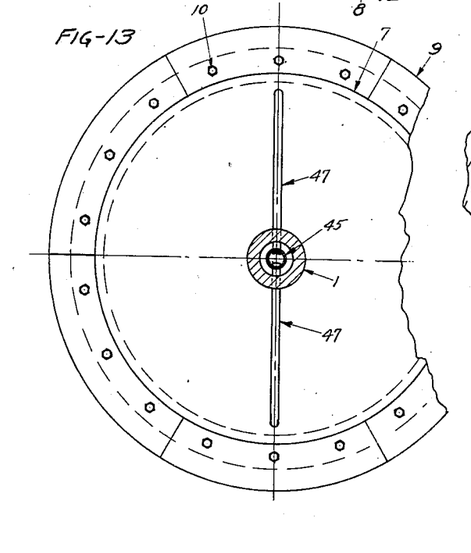
Figure 13 is a view on the plane 13—13 of Figure 8.

In Figures 6 to 10 inclusive, and Figure 13, the welding rolls 6 and 7 are brought very closely adjacent the core 11 and the outer loop turns 27 of the secondary run directly into openings in the electrode 6 and are brazed or welded thereto; and the annular cylindrical tubes 38 and 39, which make connection with the electrode 7 to the spacing collar 21 that is welded to the tube 22, are materially shortened, and the members 30 and 31 are not utilized at all, the chamber 37 being formed by means of an annular plate 50 brazed or welded to the inner face of the electrode wheel 6 which is adjacent the insulator 8, the method of passing cooling fluid through this transformer being substantially the same as through the transformer shown in Figures 1 and 3.

Figure 12:
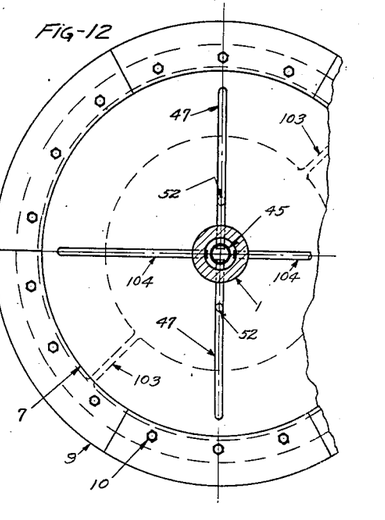
Figure 12 is a view on the plane 12—12 of Figure 11.

In Figure 6, the plate 29 is removably held in place by screws 102 and the chamber 28 is divided into a plurality of parts, four being indicated; also, the chamber 42 is subdivided as shown in dotted lines 103 (see Figure 12).

Figure 11:
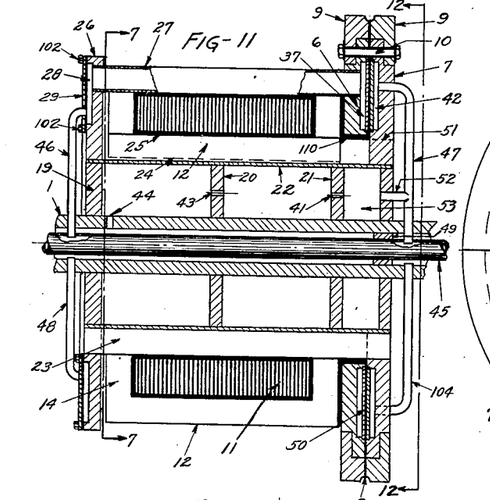
Figure 11 is a sectional view through a transformer having parts somewhat differently arranged from the showing of Figure 6.

In Figures 11 and 12, the arrangement is very similar to that shown in Figure 6, except the portions of the secondary turns inside the core 11 run directly into the outer electrode 7, as indicated by the dotted line 51, and are brazed or welded directly thereto. This arrangement is a somewhat simpler construction over those previously described and aids in reducing the cost and electrical losses in the machine. The method of cooling the rolls 6 and 7 is slightly different from that shown in the previous figures, in that the chamber 42 does not extend as far toward the shaft and the electrode contacts directly with the annular tube 22. The chamber 42 is divided into four quadrants, as shown in Figure 12, cooling fluid passing into two of the quadrants by the pipes 47 and out the other two through pipes 104. Connections 52 extend from the pipe 47 into a chamber 53 which in turn is connected to the other chambers within the tube 22 in the manner already described.

Figure 15:
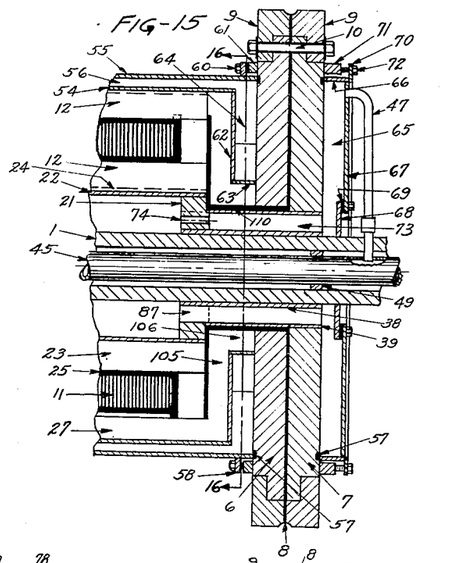
Figure 15 is a part-sectional view through a rotary transformer showing a modified form of secondary and method of cooling the contact rolls.
Figure 16:
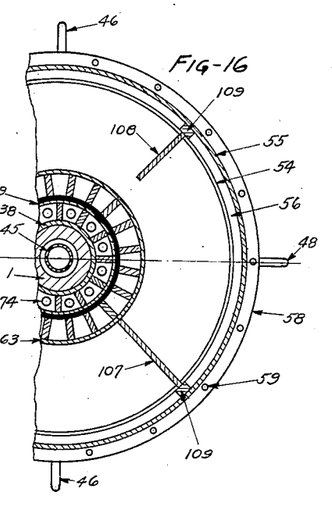
Figure 16 is a section on the line 16—16 of Figure 15.

In the construction shown in Figures 15 and 16, the outer part of the secondary is made of two concentrically arranged tubes 54 and 55, the space 56 between them being the cooling chamber. The end of the cylindrical tube 55 fits in an annular recess in the electrode 6. Preferably, this recess has packing 57 therein so as to make a fluid-tight joint. To the tube 55, is fastened as by brazing or welding, an annular flange 58, which flange has holes 59 to receive cap screws 60 which go directly into the electrode member 6 or a flange 61 thereon. While most of the current will be carried by the inner tube 54 and associated bars, some may be carried through the tube 55 by way of the connection described. Also, connection is made from the tube 54 by reason of an annular disc 62 being welded to the end of the tube 54 and also to the collar 63, which in turn is brazed or welded to the electrode 6, thereby forming a large cooling chamber 64 adjacent the face of the electrode 6. Bars 105, having inturned ends 106, are also welded to the bars 27 and to disc 62, while the ends 106 are welded or brazed to ring 63 and to electrode 6. The chamber 64 is preferably divided into two chambers by separators 107 and each chamber has a baffle plate 108. The space 56 is also subdivided by strips 109.

A cooling chamber 65 is provided on the outer face of the electrode 7 by means of a collar 66 which may be in the form of a flange integral with a disc 67. The inner part of the member 67 is carried on a collar 68 fastened to shaft 1, packing 69 being used to seal the joint at this point. The member 67 at its outer periphery, is held in position by a spider 70 bolted to the electrode 7 or a flange 71 thereon, by means of cap screw 72. The inner periphery of the members 6 and 7 is carried on a tube 39 supported on bar ends 87 which in turn rest on tube 38 on the shaft 1. An insulator 110 insulates the electrode 6 from its supporting tube 39. By this construction, the chamber 65 can be opened up for the purpose of cleaning; also, the chamber 64 can be opened up by taking off the outer annular tube 55. The large cooling chamber 65 is connected by an annular passage 73 and holes 74, to inner cooling chambers similar to those already described.

Cooling fluid is passed to the cooling chamber 65 by the pipe 47. The ends of the tubes 54 and 55, remote from the electrodes 6 and 7, are supported in the same manner as shown in the construction shown in Figure 17, wherein the cross-connecting bars between the primary turns and the secondary turns act as supports, the primary cross-connecting bar being indicated by 75, and the secondary cross-connecting bar by 76. Spacing blocks 77 are positioned between the extreme outer ends of the tubes 54 and 55. The tube 55 is provided with a flange 78 to which is bolted a member 79 that holds a gasket 80 in position, thereby closing off, at this end, the chamber 56. The supply pipe 46 carries a cooling fluid into the chambers 56 and 64, from where it is returned by the pipe 81 to the space between the shaft 1 and the main supply pipe 45.

From this construction, it will be seen that a large water jacket is provided around the entire transformer, giving the transformer a smooth finished appearance as shown in Figure 19. Furthermore, as has been explained, the water jacket can be opened up to clean it out for the reasons heretofore explained.

Figure 17:
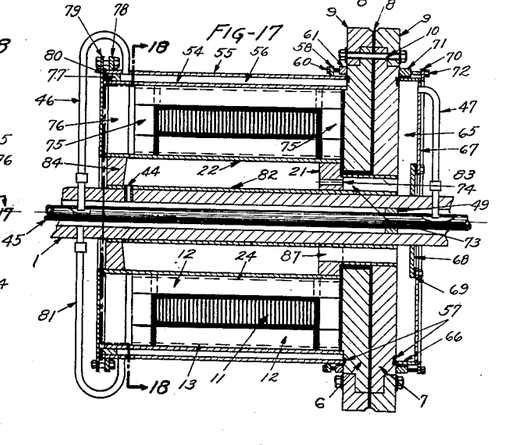
Figure 17 shows a design somewhat similar to that illustrated in Figure 15, but a different construction of the secondary, the design being particularly adapted for smaller sizes of transformers.
Figure 18:
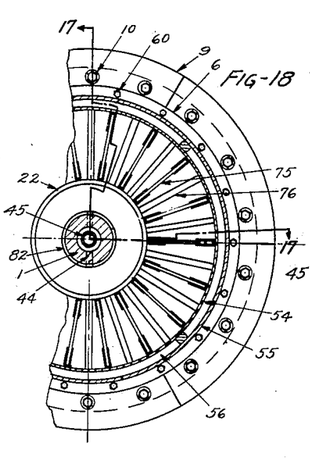
Figure 18 is a view on the plane 18—18 of Figure 17.

In Figure 17, the water chamber 64 is omitted by brazing or welding the end of the tube 54 directly to the electrode 6. It is possible to do away with the chamber 64 on the smaller sizes of transformers. Furthermore, in this figure, the bar form of conductor for the secondary is entirely omitted, and the inner loops of the secondary turns are provided by means of tube 22 and the tube 82, the tube 22 being brazed or welded to the spacing collar 21 which in turn is brazed or welded to the tube 82 and to a tube 83 securely connected to the electrode 7. Thus, in the form of transformer shown in Figure 17, the secondary is composed of two pairs of concentrically arranged tubes, one pair inside the core of the transformer, and the other on the outside of the core of the transformer, the outer pair being connected to one of the wheel electrodes, while the inner pair is connected to the other electrode of the welding wheel. A collar 84 is brazed or welded to the opposite ends of the tubes 22 and 82, and likewise, the secondary cross-connection 76 is welded to the tube 22 and to the tube 54, as has been explained.

Because of the relatively large area of the cooling chambers 56 and 65, these chambers are not very apt to be fouled up with foreign matter, at least not for a long time, when it is understood that the water is forced through these chambers under pressure. In any event, if it is desired to clean these cooling chambers, it may be done without dismantling the whole transformer or damaging the same.

Figures 23, 24, 25, 26, 27:
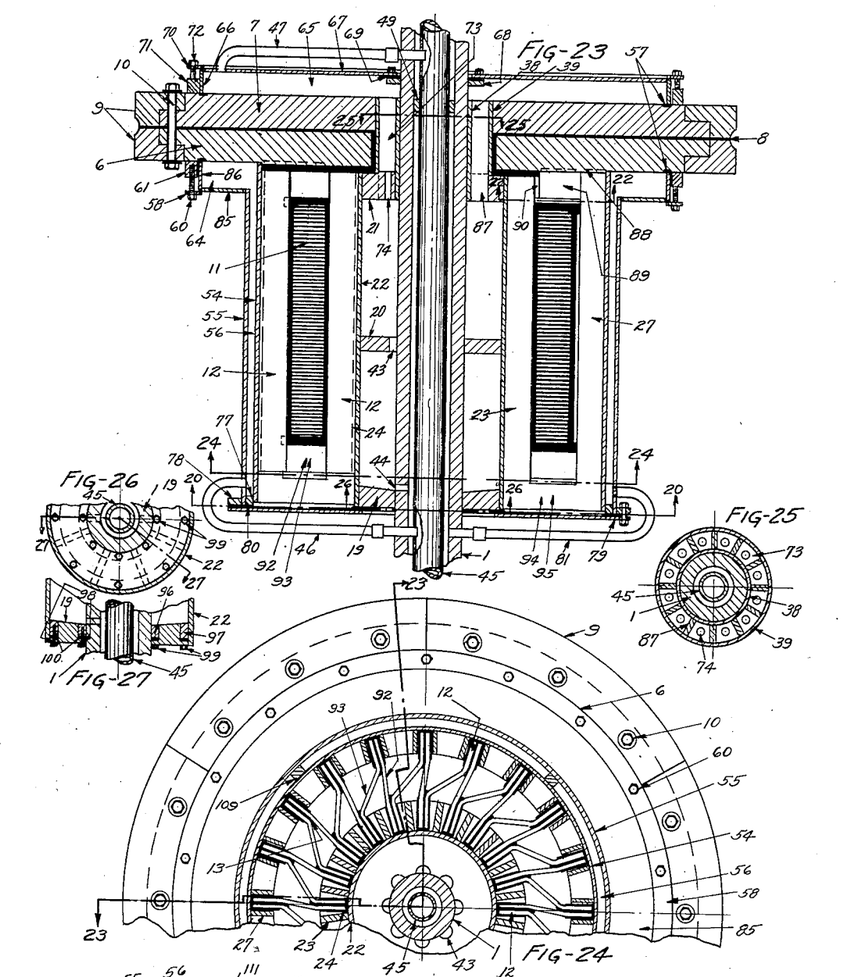
Figure 23 shows a still further modified manner of cooling the transformer, especially the welding rolls, and is a section on the line 23—23 of Figure 24.
Figure 24 is a view on the line 24—24 of Figure 23.
Figure 25 is a section on the line 25—25 of Figure 23.
Figure 26 is a part-sectional view on the line 26—26 of Figure 23.
Figure 27 is a section on the line 27—27 of Figure 26.

In Figure 23, the construction is somewhat like that shown in Figure 17, in that the tube 54 rests on an annular shoulder on electrode 6 and is brazed or welded thereto, but the tube 55 has an outwardly extending flange 85 having a ring 86 resting against the packing 57, the flange 85 and ring 86 being held in position by the cap screw 60 as in Figure 15. This construction brings the cooling chamber 64 out beyond the end of the core 11, where it is exposed to circulation of air through the rotation of the transformer or otherwise. While this construction requires a somewhat larger welding wheel, it shortens the transformer and thereby the cost, and somewhat increases the efficiency.

The construction of the cooling chamber with respect to the electrode 7 is substantially the same as that described with respect to Figure 15. As shown in Figure 25, the tubes 38 and 39 are braced by the bars 87 to which both of them are preferably brazed or welded. Thus, the pressure on the welding wheel is transmitted to the shaft 1. This same construction may also be used in the design shown in Figure 15.

Figure 20:
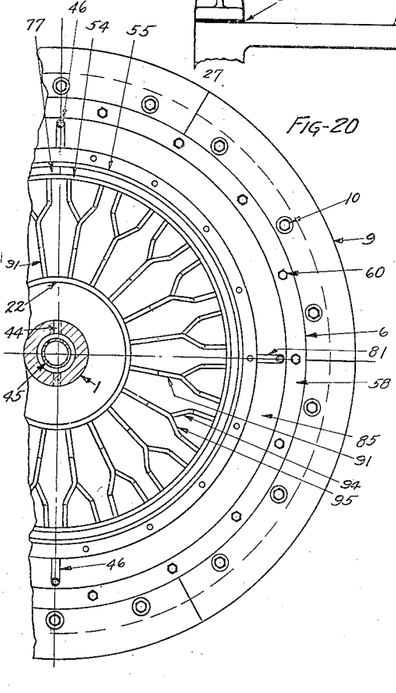
Figure 20 is a view on the plane 20—20 of Figure 23.
Figure 22:
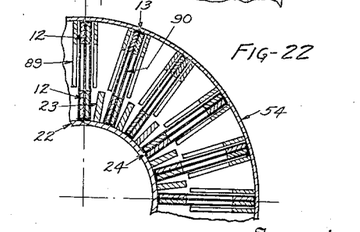
Figure 22 is a fragmentary section on the line 22—22 of Figure 23.

Figure 22 shows how the ends, connecting the inner portions of both primary and secondary, are connected to the outer portions of these windings. As shown by the dotted line 88, Figure 23, recesses are provided in the electrode 6, and one edge of the secondary bar ends 89 is brazed or welded within these recesses, and the primary bar ends 90 are positioned between two of the secondary end connectors. The ends of the inner portions of the secondary conductors are indicated by 91, Figure 20, being positioned between the two parts 90 of the primary and welded to the tube 22, as has already been explained. The tube 22 in turn is welded to the collar 21, and through the tubes 38 and 39 as well as the spacing members or support bars 87, thus comprises the mechanical and electrical connection with the electrode 7.

The connection of the primary and secondary at the opposite ends, as just described, of the transformer, are shown in Figure 24. The inner parts of the secondary bars are indicated, as has been stated, by 23, and the primary end connections by the numbers 92 and 93. As the secondary risers 91 leave the inner support tubes 22, they are preferably forked into two branches 94 and 95 (see Fig. 20), which pass on either side of the primary end connections 92 and 93 (see Fig. 24), and these forked portions 94 and 95 are brazed or welded to the bars 27, two in number in this case, which bars are in turn welded or brazed to the tube 54, thereby completing the secondary end connection at this end of the transformer, while the primary risers 92 and 93 are brazed, sweated, or welded to their horizontal portions.

In order that the cooling chamber between the tube 22 and the shaft 1 may be cleaned out, the end collar 19 may be constructed in the manner shown in Figures 26 and 27, wherein a ring 96 is fastened to the shaft 1, and a ring 97 is fastened to the tube 22, and the collar 19 is provided with a flange 98 which is fastened to the rings 96 and 97 against gaskets 100, as by screws 99, thereby allowing the collar 19 to be removed to get access to the inner cooling chamber.

When the construction shown in Figures 26 and 27 is used, it is preferable to use longitudinal spacers for the tube 22 in place of the collar 20.

Figure 28:
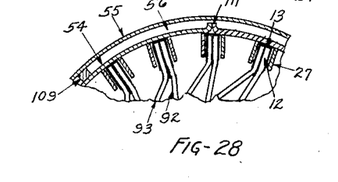
Figure 28 is a fragmentary view of a modification of the construction shown in Figure 24.

In Figure 28, the inner tube, comprising part of the outer secondary turns, is preferably made in sections joined together in any satisfactory manner as indicated by the flanges 111. By dividing the tube 54 into a number of sectors, the bars 27 are more readily welded to these sections or sectors of the tube 54 before the tube and the bars are put in place. After the bars have been brazed or welded to the sections of the tube 54, they are then slipped into place as shown in Figure 28, and the joint 111 is brazed or welded; after which the outer tube 55 can then be put into position. Preferably the bars 27 are so positioned on the inner periphery of the tube 54 that they will closely embrace the primary conductors to assist in holding them in place, and also to convey heat therefrom to the cooling chamber 56. If necessary, spacers may be arcuately arranged between the bars 27 so as to hold these bars all securely together.

From what has been said, it will be obvious that a great many of the details in the various designs shown and described herein may be varied, and this should be kept in mind in reading the attached claims.

Having thus described my invention, what I claim is:

1. A rotary transformer including a core, a primary having turns surrounding said core, a secondary having a plurality of parallel loop conductors of large current capacity arranged in intermingled relationship with the primary turns, a twin electrode wheel positioned adjacent one side of the core, a disc at the opposite side of the core and connected to all the secondary end conductors on that side of the core, while the ends of the secondary at the opposite side of the core are connected directly to their proper electrode of the wheel, thus forming working terminals of the secondary, each portion of the wheel itself having a cooling chamber and means for passing cooling fluid through said chamber.

2. A rotary transformer as set forth in claim 1, further characterized in that said disc also has one or more cooling chambers and at least the outer part of each secondary conductor is hollow and the hollow portion opening into a chamber in the disc, and a chamber in one of said wheel electrodes, and means for passing a cooling fluid through said chambers and hollow secondary conductors.

3. A rotary transformer as set forth in claim 1, further characterized in that the inner and outer parts of the secondary conductors are in bar form and extend in parallelism from said disc to their respective wheel electrodes.

4. A rotary transformer as set forth in claim 1, further characterized in that the electrode wheel is of greater diameter than the core and each electrode provided with cooling chambers, and means including hollow parts of said secondary conductors for passing cooling fluid through said chambers.

5. A tube welding transformer including; a hollow shaft, spacing members carried by said shaft, a tube around said spacing members, portions of primary and secondary conductors alternately arranged longitudinally of but arcuately spaced around the outer periphery of said tube, at least the primary conductors being insulated from the tube, an annular core resting on but insulated from said conductor portions, primary and secondary conductor portions arranged alternately on the exterior surface of the core but insulated therefrom, a twin electrode wheel carried on the ends of the secondary conductors at one side of the core, thereby forming terminals of the secondary winding, means for joining the opposite ends of the secondary conductors, the electrodes of the wheel and at least the outer secondary conductor parts being hollow, and means for passing a cooling fluid therethrough.

6. A tube welding transformer as set forth in claim 5, further characterized in that said spacing members form chambers interior of said tube, and means are also provided, including the hollow shaft, for passing cooling fluid through said chambers interior of said tube.

7. A rotary transformer including an annular core, a primary winding looped around the core, a twin electrode wheel located closely adjacent the core, a secondary composed of a plurality of concentrically arranged tubes positioned within and without the core, said tubes being spaced apart in pairs to form cooling chambers, one pair of tubes being connected at one end to one wheel electrode, while the other pair of tubes have their corresponding ends connected to the other wheel electrode, means for connecting the opposite ends of all tubes together, and means for passing a cooling fluid through said cooling chambers.

8. A rotary transformer as set forth in claim 7, further characterized in that individual cooling chambers are formed with each wheel electrode and said tubes open into said wheel electrode chambers.

9. A rotary transformer including an annular core, a primary winding looped around the core, a twin electrode wheel located closely adjacent the core, a secondary composed of a plurality of concentrically spaced tubes, at least two of which are positioned around the core and primary winding and being joined at one end to one wheel electrode forming a cooling chamber with said electrode, means for forming a cooling chamber with the other wheel electrode, and means for passing a cooling fluid between said two tubes and said wheel electrode chambers.

10. A rotary transformer as set forth in claim 9 further characterized in that cooling chambers are provided within the core of the transformer, the wall of these chambers being in close contact with the inner portions of both primary and secondary conductors, and means for passing a cooling fluid through said inner chambers.

11. A rotary welding transformer having a core and a twin electrode wheel adjacent the core, primary and secondary windings arranged around the core, the secondary terminating in said electrodes of the wheel, at least the outer portions of the secondary turns being alternately disposed between the primary turns and being hollow, and expanded to fill the space between the outer portions of the primary turns, and means for passing a cooling fluid through said hollow portions.

12. A rotary welding transformer as set forth in claim 11, further characterized in that cooling chambers are provided for each wheel electrode and also within the space enclosed by the core and closely adjacent the inner portions of the primary and secondary turns, and means for passing cooling fluid through said chambers.

13. A rotary welding transformer having a core and a twin electrode wheel adjacent the core, primary and secondary windings around the core, the secondary terminating in said electrodes of the wheel, a casing around the transformer, said casing closed at one end by the electrode wheel and at the other end by a suitable closing means completing an annular cooling chamber within said casing itself, and means for passing cooling fluid through said chamber.

14. A rotary welding transformer as set forth in claim 13, further characterized in that independent cooling chambers are provided for each wheel electrode and also within the space enclosed by the core and closely adjacent the inner portions of the primary and secondary conductors, and means for passing cooling fluid through said chambers.

15. A rotary welding transformer having a core and a twin electrode wheel adjacent the core, primary and secondary windings around the core, the secondary terminating in said electrodes of the wheel, that part of the secondary external of the core, including a pair of spaced tubes forming a cooling chamber around the transformer, and means for passing cooling fluid through said cooling chamber.

16. A rotary welding transformer as set forth in claim 15, further characterized in that the inner of said tubes is arranged in arcuate sections joined together as and for the purpose described.

17. A rotary welding transformer as set forth in claim 15, further characterized in that the inner of said tubes is arranged in sections having the ends of the secondary conducting bars fastened to the inner periphery thereof before the sections are assembled so as to overlap the primary turns as and for the purpose described.

18. In a rotary transformer, having an annular core, a hollow shaft extending therethrough, primary and secondary windings looped around the core, at least the inner portions being arranged in intermingled relationship, and a twin electrode wheel positioned adjacent one end of the core and forming the terminals of the secondary; further characterized in that each electrode portion of the wheel has an individual fluid cooling chamber and said shaft carries a plurality of spacing members on the outer periphery of which is positioned a metallic tube, the diameter of said spacing members being such as to form a large cooling chamber between the tube and shaft, the inner parts of the secondary turns resting on and contacting with said tube, the inner parts of the primary turns also resting on said tube but insulated therefrom, the outer parts of the secondary loops being hollow and connected to the chambered parts of one of the wheel electrodes, and means including said hollow shaft for passing cooling fluid through all of said cooling chambers.

19. A rotary transformer including a shaft extending therethrough and an annular core spaced from and around said shaft; a primary and a secondary winding looped around the core, a twin electrode wheel positioned in fixed relation adjacent one end of the core and forming the terminals of the secondary, the portions of the secondary within and without the core being subdivided into a plurality of parts, spacing members between the shaft and the parts of the winding forming the inner turns, thereby forming large cooling chambers within the core for both the core and said inner parts of the windings, and at least some of the outer portions of the windings also being arranged to form cooling chambers exterior of the core, each electrode portion of the wheel carrying a fluid cooling chamber, and means for passing a cooling fluid through said chambers.

20. A rotary welding transformer having; a continuous hollow shaft extending through the transformer, a core surrounding the shaft but spaced therefrom, a twin electrode wheel mounted adjacent the core, each electrode of the wheel having a cooling chamber, primary and secondary windings around the core, the secondary terminating in said electrodes of the wheel; said transformer further having, support and spacing members carried by the shaft, a tube carried by said support and spacing members at a considerable distance from the shaft to form a large fluid cooling chamber with means for connecting said chamber to the interior of the hollow shaft, at least the inner parts of the primary turns resting on but being insulated from said tube, said tube being in the secondary circuit, cross-connecting and support means for one end of the inner parts of the secondary resting on one end of said tube directly above one of said support and spacing members, parts of said secondary winding forming a cooling chamber outside of the core, and means for passing cooling fluid through all of said chambers.

THOMAS M. HUNTER.